United States Patent
Klix

[19]

[11] Patent Number: 5,950,720
[45] Date of Patent: Sep. 14, 1999

[54] CEILING RADIATOR

[76] Inventor: Uwe Klix, Eisenbahnstrasse 16, D-78628 Rottweil, Germany

[21] Appl. No.: 08/840,951
[22] Filed: Apr. 21, 1997
[30] Foreign Application Priority Data Apr. 21, 1996 [DE] Germany .................. 196 17 718

[51] Int. Cl.⁶ .................................................. F28F 1/42
[52] U.S. Cl. ............................................. 165/179; 237/70
[58] Field of Search ................. 392/436; 165/53, 165/49, 179, 181; 237/70, 71, 73

[56] References Cited

U.S. PATENT DOCUMENTS

| | | | |
|---|---|---|---|
| 4,301,862 | 11/1981 | McAlister | 165/165 |
| 4,341,346 | 7/1982 | Simpson | 237/70 |
| 5,363,908 | 11/1994 | Koster | 165/49 |
| 5,460,415 | 10/1995 | Lengauer et al. | 285/61 |
| 5,479,912 | 1/1996 | Dunne | 126/91 A |
| 5,579,996 | 12/1996 | Fiedrich | 237/69 |
| 5,690,167 | 11/1997 | Rieger | 165/133 |

FOREIGN PATENT DOCUMENTS

| | | |
|---|---|---|
| 1 553 142 | 1/1969 | France . |
| 2 615 932 | 12/1988 | France . |
| 2262548 | 12/1991 | United Kingdom ............ 237/69 |
| 2 262 548 | 6/1993 | United Kingdom . |
| 91/13294 | 9/1991 | WIPO . |

Primary Examiner—Henry A. Bennett
Assistant Examiner—Derek S. Boles
Attorney, Agent, or Firm—Kenyon & Kenyon

[57] ABSTRACT

Ceiling radiators for the heating or cooling of rooms, with a compact design preferably made of a powder-coated, X- or similar shaped, aluminum, extruded profile. The radiator is of light weight and has high resistance to deformation, and is available up to 12 meters in overall length, with a maximum circular diameter up to 350 mm. The radiator includes a heating pipe having four curved radiant surfaces integrally molded to the pipe, with attachment rails. The heating-pipe ends are equipped with internal screw threads for tube connections and pipe compensators. In one economical design, a directly-heated radiant pipe has twelve radiant surfaces arranged around it on six radiant plates, and includes four attachment rails. The invention produces a broad, all-round radiation on the surrounding room surfaces and furnishings, so that heat encirclement is produced with optimum comfort to people underneath it.

16 Claims, 6 Drawing Sheets

CEILING RADIATOR

BACKGROUND OF THE INVENTION

1. Field of the Invention

The present invention relates to ceiling radiators, with or without fresh air supply, which are hung freely under room ceilings and are used to heat rooms of all types. Heating is carried out predominantly with hot water or steam from a central heating installation, or with cold water in the case of cooling operation, or with hot waste gases from gas or oil burners.

2. Description of the Prior Art

Customary ceiling radiant-strip heating installations use a broad, beaded or crimped, radiant-plate strip made of sheet metal, into which a pipe register, through which water flows, is welded. To limit the loss of heat, a thermal insulation is often placed to the top of the installation.

Customary directly-heated radiant pipes use a reflector radiating toward the floor, the reflector being irradiated by a heating pipe arranged under it through which hot waste gases from an oil or gas blower or burner flow, and an exhaust fan for causing flow of the gases.

Both of the above-described designs have the disadvantage that the irradiated floor surface is very small in proportion to the hot radiant surface of the ceiling radiators which, given higher heating temperatures, very disadvantageously affects the comfort level of the room.

In addition, the type of manufacturing used in the prior art apparatuses, requiring many structural members welded together—like beaded sheet-metal plates with lateral beveled edges, flow-through pipes and headers, reinforcing strips with mounting holes and frontal plates —is very costly.

SUMMARY OF THE INVENTION

The present invention is ceiling radiator which provides good heat distribution and is not costly to manufacture. Because of the good thermal insulation customary in buildings today, with the present invention, a new kind of ceiling radiator can be created which is adaptable to the time of day, has substantially smaller structural dimensions and lower weight, and provides considerably better heat distribution with fewer occurrences of drafts.

The objects of the present invention are achieved by a new kind of hot- or cold-water or -gas ceiling radiator, produced predominantly as an X-shaped, extruded profile made from aluminum, coated with colored powder. Due to the diagonal arrangement of the multiple, preferably eight, curved, radiant surfaces on a central heating pipe, the present invention can have a substantially smaller construction with great resistance to deformation and a low weight. The present invention may be made up to 12 meters in overall length, and can include a heating pipe with four or more curved radiant surfaces integrally molded to the heating pipe and projecting from the heating pipe like rays, which may include attachment rails. The heating pipe ends may include internal screw threads for pipe joints, tube connections and pipe compensators. In addition, extruded, U-shaped air ducts can be inserted on or underneath the ceiling radiators.

Due to the low weight having a low energy-storage volume, optimum temperature adjustability is possible with the present invention, with almost immediate change from hot to cool operation, thereby providing optimum comfort and low energy consumption. The temperature-buffering effect of floors and room surfaces is largely retained to compensate for changing heat release from persons in the room, light and other electrical devices, and unpredictable exposure to sunlight. The present invention meets guidelines for comfort in offices where there is sedentary activity, which require a floor which is at least one (1) degree Celsius colder than the room air temperature.

In the case of directly-heated radiant pipes for hot waste gases, a design having six radiant plates that are free of radiant heat shadows, making up twelve radiant surfaces, without the need for reflectors, is provided, whereby the usual uncomfortable surface temperatures are sharply reduced.

BRIEF DESCRIPTION OF THE DRAWINGS

In the enclosed drawing figures, several exemplary embodiments and examples of application are shown.

DETAILED DESCRIPTION OF THE INVENTION

The ceiling radiators shown in FIGS. 1 to 10 have the feature in common that an optimum resistance to deformation is achieved with the smallest structural dimensions and low weight. In addition, because of the X-shape, or equivalent shape, of the radiators, the effective radiant-plate surface and heat-radiation power per heating pipe is at least doubled.

Figure 1:
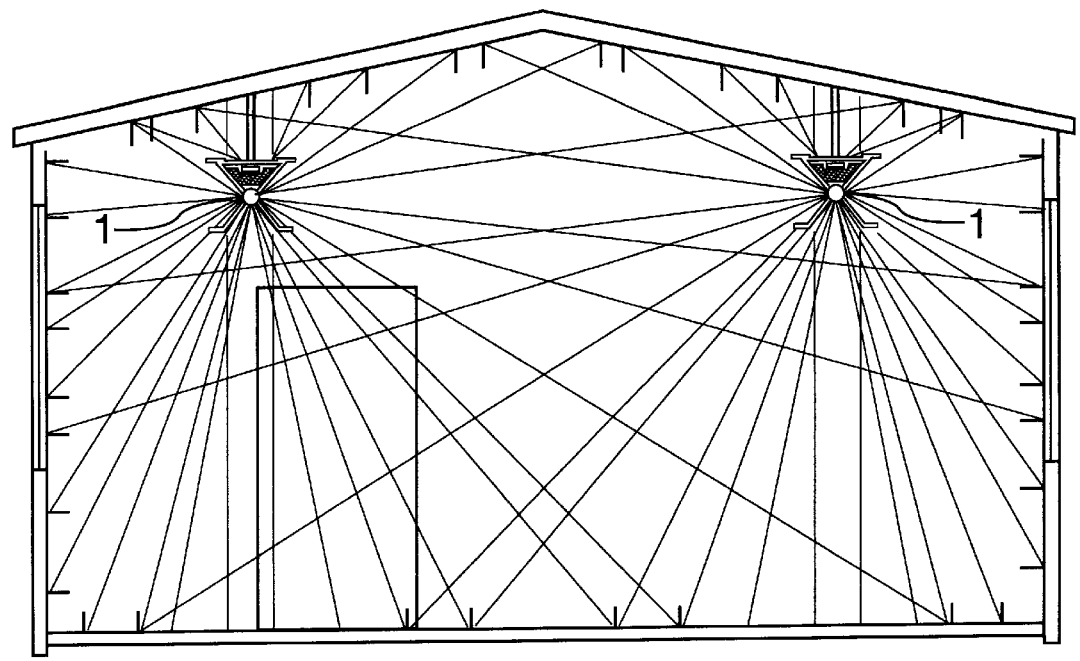
FIG. 1 shows the front, cross-sectional view of two X-shaped, one-pipe ceiling radiators hung under a room ceiling.

FIG. 1 shows a ceiling radiator of the present invention installed in a room and suspended from the ceiling of the room. Two radiators 1 are suspended from opposite sides of the room. FIG. 1 shows, through lines extending from the radiators 1, the manner in which the radiant energy from the radiators 1 is dissipated, through direct radiation and reflected radiation, throughout the room. As seen in FIG. 1, no radiant shadows reduce the heating effectiveness of the radiators 1.

Figure 2:
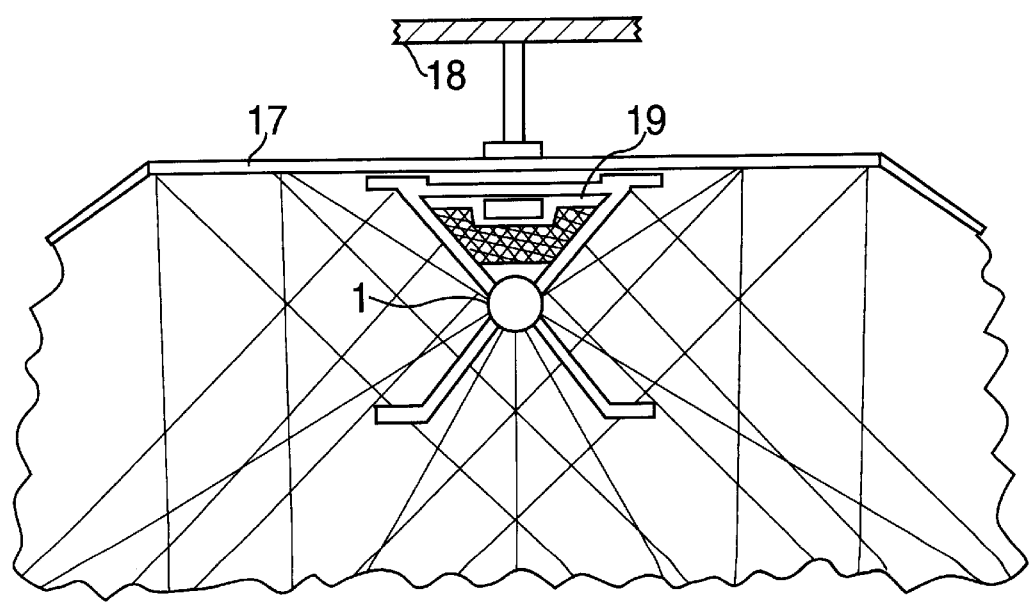
FIG. 2 shows a detailed, cross-sectional view of an X-shaped ceiling radiator or the type in FIG. 1, with inserted thermal insulation and a mounted reflector.

FIG. 2 is a detail view of one of the radiators 1 as shown in FIG. 1. The radiator 1 is suspended from the room ceiling 18. An insulated holder 19 may attach the radiator 1 to the room ceiling 18. A radiant heat deflector 17, which as shown in FIG. 2 reflects radiant heat away from the room ceiling 18, may be attached to the holder 19.

Figure 3:
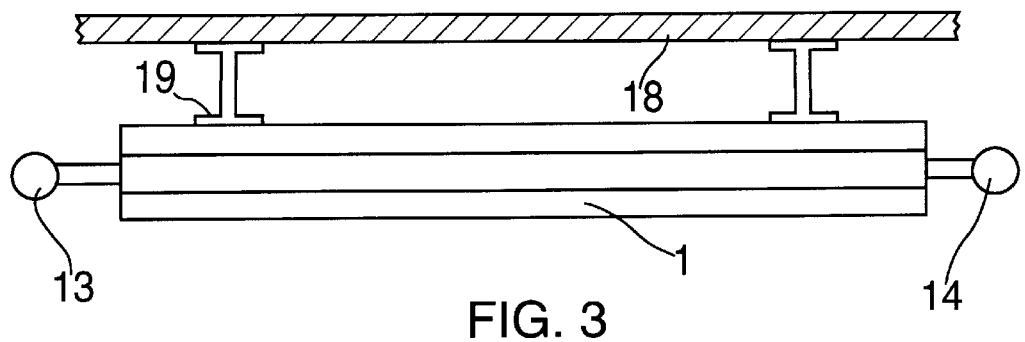
FIG. 3 shows a side view of a hot-water ceiling radiator with heating forward flow and return lines.

As shown in FIG. 3, the radiator 1 can extend for some length along the room ceiling 18. In a preferred embodiment, the radiator 1 has dimensions of 130 mm (height)×130 mm (width) and a length adapted to the room size (up to 12 meters in overall length), with a maximum circular diameter up to 350 mm, and can use an internal heating pipe of 1¼" in diameter. One or more holders 19 extend down from the room ceiling 18 and are connected to the radiator 1. At one end of radiator 1 is connected a heating forward flow conduit 13, and at the other end of the radiator 1 is connected a heating return flow conduit 14. The heating fluid passes from a heat source, through conduit 13, through the internal pipe of radiator 1, and through conduit 14. The heating-pipe ends may be equipped with internal screw threads for tube connections and pipe compensators.

Figure 4:
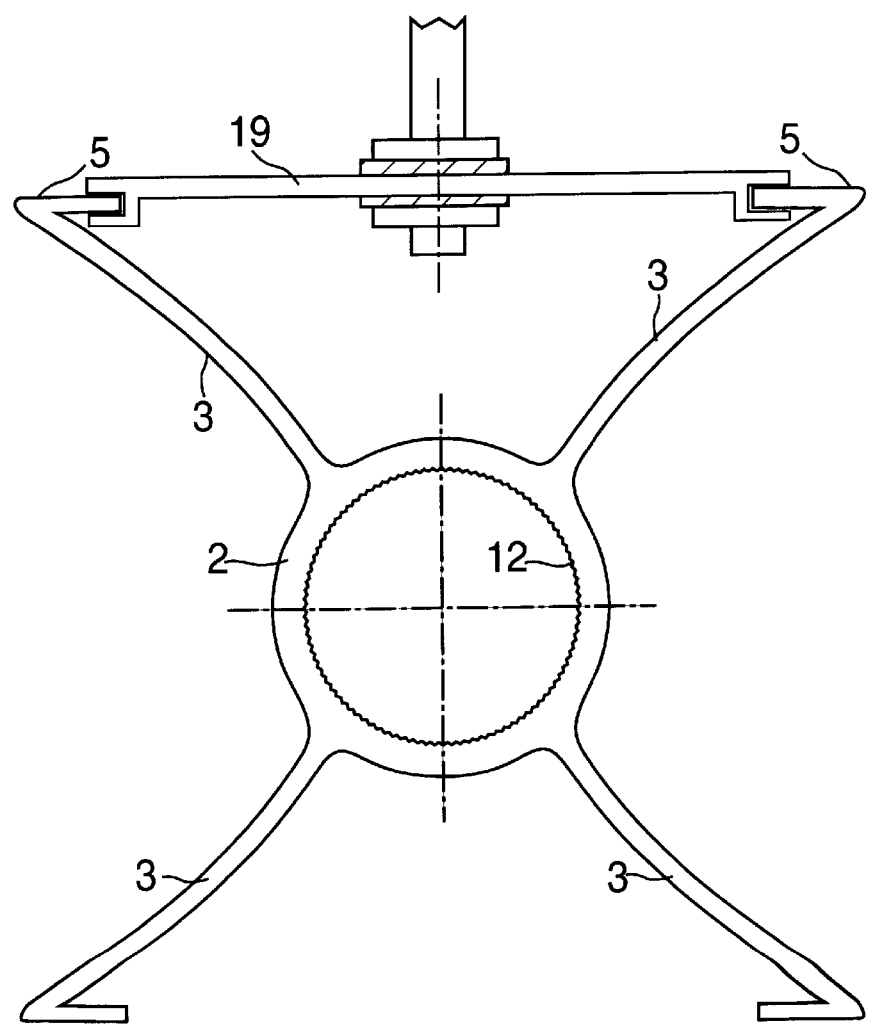
FIG. 4 shows a front view of an X-shaped, one-pipe, ceiling-radiator with an extruded profile, with eight curved radiant surfaces on four radiant plates with attachment rails, between which an attachment profile is inserted.

FIG. 4 shows a detail cross-sectional view of one embodiment of a radiator 1 of the present invention, having an "X" profile. The holder 19 includes two attachment channels, as well as insulation at the portion connected to the room ceiling securing post. The radiator includes four bow-like radiant plates P, each of which includes an attachment rail 5. The attachment rails 5 fit into the attachment channels on the holder 19. The bow-like radiant plates P each have two radiant surfaces 3, such that the radiator 1 of FIG. 4 has eight radiant surfaces 3. The bow-like radiant plates P project radially from a heating pipe 2, through which a heating or cooling fluid flows. The heating pipe 2 may have corrugation 12 on its inside, to improve transfer of heat to or from the heating or cooling fluid to the bow-like radiant plates P, as the result of increased turbulence of the fluid. As an alternative to corrugation, profile bars or spirals may be inserted in the heating pipe 2 to increase turbulence and therefore heat transfer.

Figure 5:
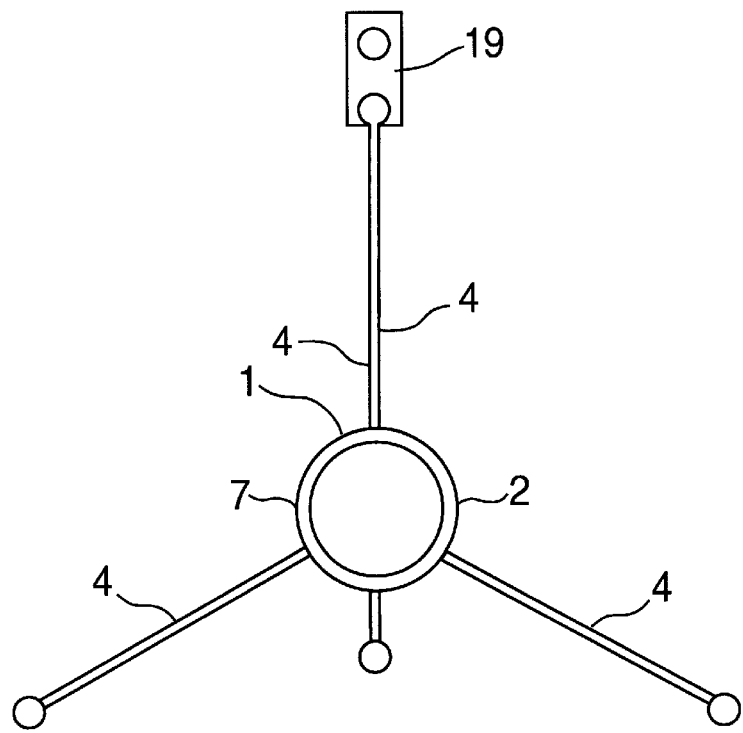
FIG. 5 shows a front view of a Y-shaped, one-pipe ceiling radiator with three radiant plates having six radiant surfaces with rounded attachment profiles.

FIG. 5 shows a second embodiment of the present invention. The radiator 1 includes a heating pipe 2 in the form of a metal pipe 7, from which six smooth and profiled radiant surfaces 4, on three flat radiant plates, project and are equally spaced. One end of the radiant surfaces 4 has attachment rails in the form of rounded attachment profiles, which fit into a rounded attachment channel on holder 19. An additional, smaller length plate, with a rounded attachment profile, can be placed opposite one of the rounded attachment profiles at one end, thereby allowing both an upright "Y" configuration of the radiator 1 and an inverted "Y" configuration of the radiator 1.

Figure 6:
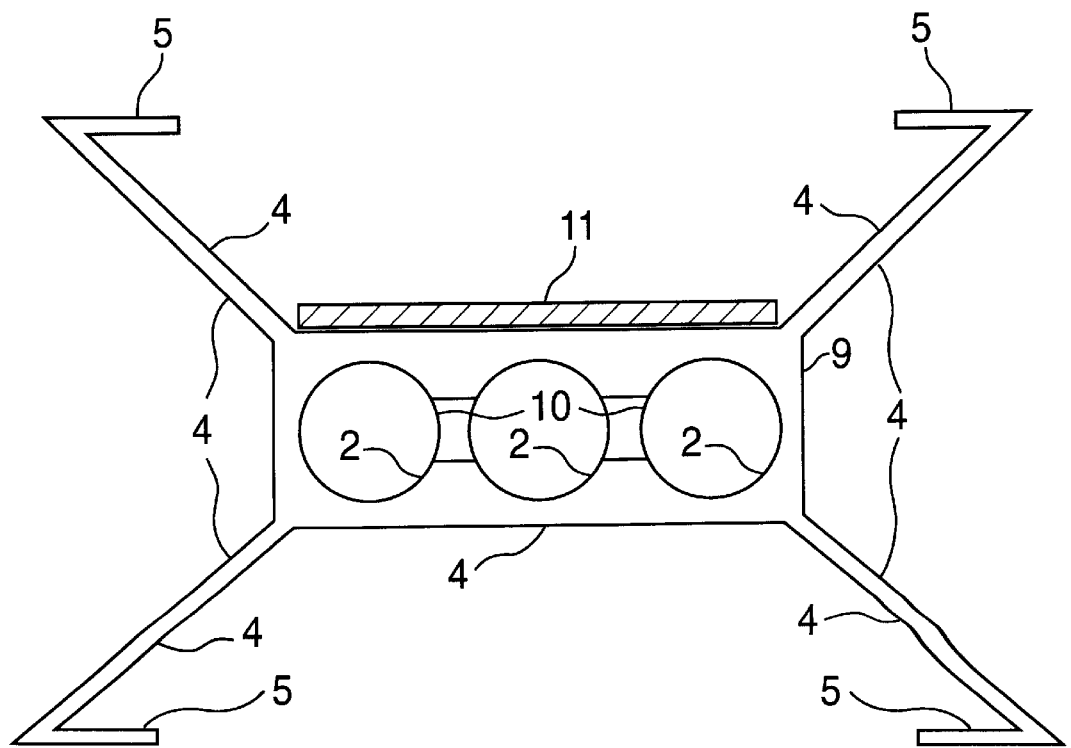
FIG. 6 shows an X-shaped ceiling radiator having ten radiant surfaces and a three-pipe register with flow-through pipes connected by cross holes, and an additional electric strip heater.

FIG. 6 shows a detail cross-sectional view of a third embodiment of a radiator 1 of the present invention, having an "X" profile. A holder similar to that shown in FIG. 4 is used to attach the radiator of FIG. 6 to the room ceiling. The radiator includes four flat radiant plates, each of which includes an attachment rail 5. The attachment rails 5 fit into attachment channels on a holder similar to that in FIG. 4. The flat radiant plates each have two radiant surfaces 4. The flat radiant plates project from, and are attached at the corners of, a heating pipe register 9. Heating pipe register 9 includes three heating pipes 2, through which a heating fluid flows. The heating pipes 2 may be connected by cross holes 10 in the heating pipe register 9. The heating pipe register also includes radiant heating surfaces 4, and may include an auxiliary electric strip heater 11 on at least one side.

Figure 7:
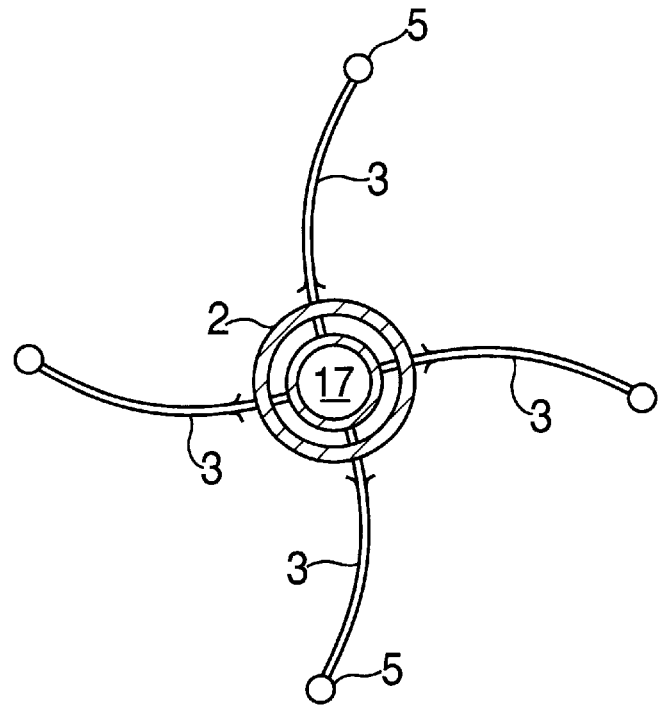
FIG. 7 shows the front view of an X-shaped, one-pipe ceiling radiator having four equal radiant surfaces.

FIG. 7 shows a fourth embodiment of the present invention, having a "Y" or "cross" shaped profile. The radiator 1 includes a heating pipe 2, from which four bow-like radiant plates 3, having two radiant surfaces each, project and are equally spaced. The ends of the radiant plates 3 have attachment rails 5 in the form of rounded attachment profiles, which fit into a rounded attachment channel on a holder similar to that in FIG. 5. A tubular reflector 17 may be included in the interior of heating pipe 2.

Figure 8:
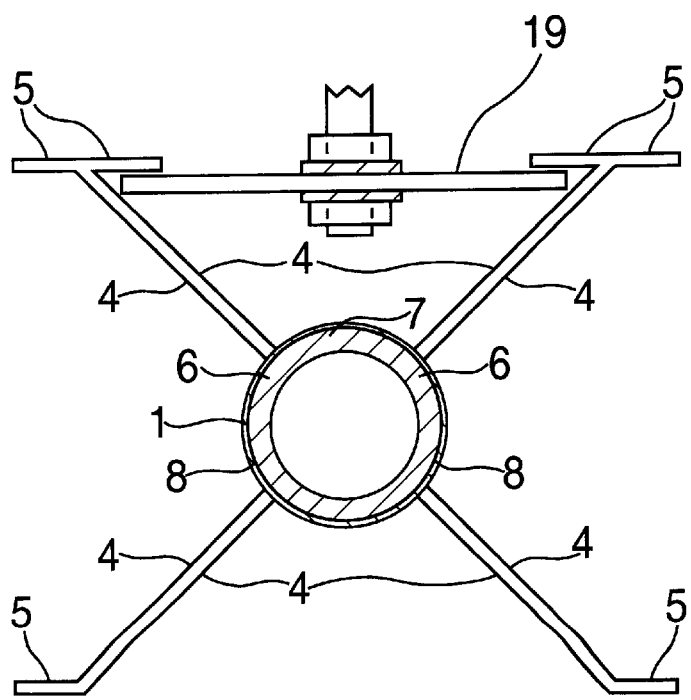
FIG. 8 shows a front view of a hung ceiling radiator, including a heating pipe on which two pairs of beaded, radiant plates are welded, with inwardly and outwardly bent attachment and supporting rails.

FIG. 8 shows a detail cross-sectional view of a fifth embodiment of a radiator 1 of the present invention, having an "X" profile. The holder 19 may be plate-like at one end, and can include insulation at the portion connected to the room ceiling securing post. The radiator includes four flat radiant plates, each with two smooth and profiled radiant surfaces 4, and each plate includes an attachment rail 5. The attachment rails 5 fit on the top of the plate portion of holder 19, to thereby suspend the radiator 1. The flat radiant plates 3 each have two radiant surfaces 4, such that the radiator 1 of FIG. 8 has eight radiant surfaces. The flat radiant plates 3 project radially from a heating pipe 2, through which a heating fluid flows. The heating pipe 2 may be a metal pipe 7, and the flat radiant plates 3 may be made from angled and beaded sheet-metal plates 8 which are welded to the metal pipe 7 through welding 6.

Figure 9:
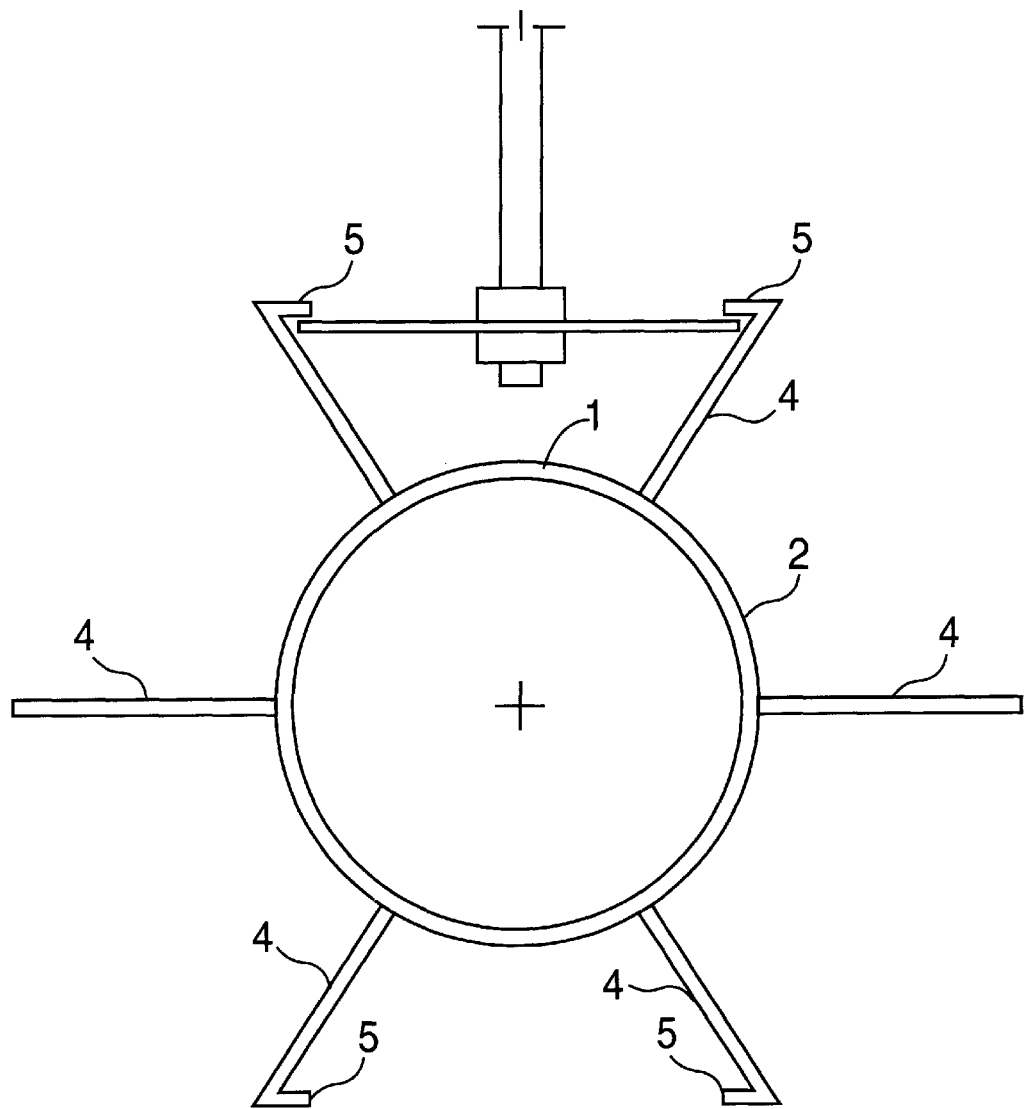
FIG. 9 shows a front view of a one-pipe ceiling radiator having a large heating pipe for hot waste gases, with twelve radiant surfaces that are free of radiant shadows, and four attachment rails.

FIG. 9 shows a detail cross-sectional view of a seventh embodiment of the present invention. The holder 19 includes a plate-like portion, and can have insulation between the plate-like portion and the room ceiling securing post. The radiator includes six flat radiant plates, four of which include attachment rails 5. The attachment rails 5 fit over the plate-like portion of holder 19. The flat radiant plates each have two radiant surfaces 4, such that the radiator 1 of FIG. 9 has twelve radiant surfaces. The flat radiant plates project radially from, and are equally spaced around, a heating pipe 2, through which a heating fluid flows.

Figure 10:
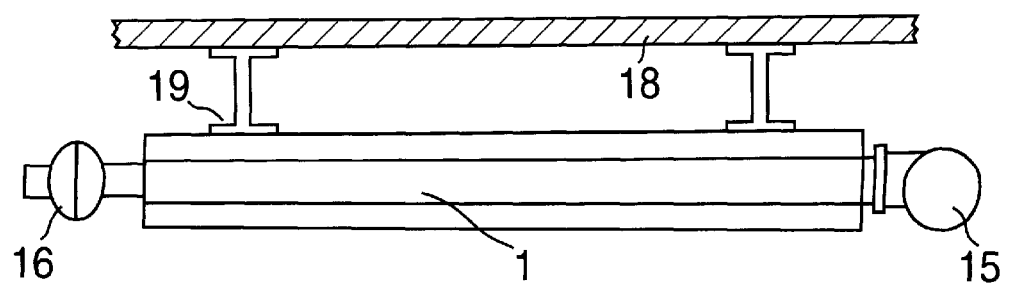
FIG. 10 shows the side view of a ceiling radiator for hot waste gases, with a gas/oil burner and blower and an exhaust fan.

FIG. 10 shows an alternative configuration to that in FIG. 3. One or more holders 19 extend down from the room ceiling 18 and are connected to the radiator 1. At one end of radiator 1 is connected a gas/oil burner and blower 15, and at the other end of the radiator 1 is connected an exhaust gas fan 16. Gas or oil is burned in the gas/oil burner and blower and the combustion gases are blown into the internal pipe of radiator 1. The combustion gases exit the internal pipe of radiator 1 and are dissipated or exhausted by exhaust gas fan 16.

Figure 11:
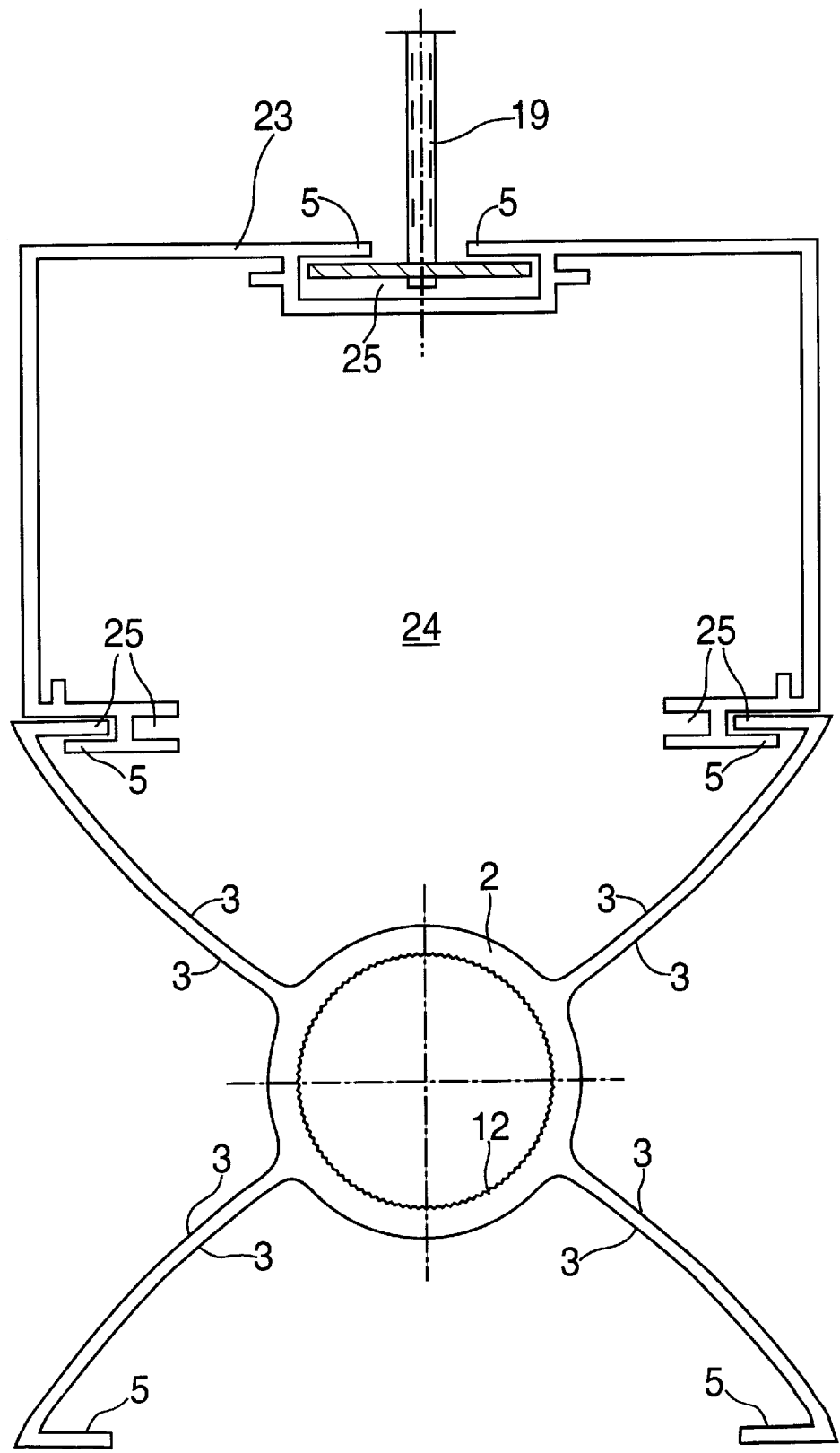
FIG. 11 shows a front view of a ceiling radiator identical to that in FIG. 4, but with a air duct mounted thereon.

FIG. 11 shows a detail cross-sectional view of the embodiment of a radiator 1 of the present invention shown in FIG. 4, which additionally includes an air duct mounted thereon. The holder 19 includes a plate, onto which an attachment groove 25 of an air duct 23. A U-shaped air duct 23 may be used for conveying heated or cooled air to a room, through an air channel 24 formed between the air duct and the radiator 1. The radiator includes four bow-like radiant plates 3, each of which includes an attachment rail 5. The attachment rails 5 fit into attachment grooves 25 on the air duct 23, or alternatively, the air duct 23 may be integrally formed with the radiator. The bow-like radiant plates 3 each have two radiant surfaces, such that the radiator 1 of FIG. 11 has eight radiant surfaces. The bow-like radiant plates 3 project radially from a heating pipe 2, through which a heating or cooling fluid flows. The heating pipe 2 may have corrugation 12 on its inside, to improve transfer of heat to or from the heating or cooling fluid to the bow-like radiant plates 3, as the result of increased turbulence of the fluid.

The radiators of the present invention are preferably made as a single piece, of, for example, extrusion-molded powder-coated aluminum or plastic.

While the invention has been described in the specification and illustrated in the drawings with reference to preferred embodiments, it will be understood by those skilled in the art that various changes may be made and equivalents may be substituted for elements of the invention without departing from the scope of the claims.

What is claimed is:

1. A ceiling radiator for heating or cooling rooms of any type, wherein the ceiling radiator hangs freely under a ceiling and directs heat to the ceiling, walls and floors of a room without radiant heat shadows, comprising:

at least one flow-through pipe, the at least one flow-through pipe conducting a heat-conducting fluid;

at least three radiant plates projecting radially from the at least one flow-through pipe, the at least three radiant plates having at least two smooth and profiled surfaces, at least one of the at least three radiant plates including an attachment element for attaching the radiator to a holder suspended from a room ceiling.

2. The ceiling radiator of claim 1, further comprising:

at least one pipe register and a plurality of flow-through pipes in the pipe register, the pipe register including cross holes connecting the plurality of flow-through pipes.

3. The ceiling radiator of claim 1, wherein:

the at least three radiant plates are bow-like radiant plates.

4. The ceiling radiator of claim 1, wherein:

the at least three radiant plates are flat radiant plates.

5. The ceiling radiator of claim 1, wherein:

the radiator is made of from extrusion-molded aluminum.

6. The ceiling radiator of claim 1, wherein:

the radiator is made of from extrusion-molded plastic.

7. The ceiling radiator of claim 1, wherein:

the at least one flow-through pipe is a metal pipe, the at least three radiant plates are made from angled and beaded sheet-metal plates, and the at least one flow-through pipe and the at least three radiant plates are welded together.

8. The ceiling radiator of claim 1, further comprising:

at least one electric strip heater.

9. The ceiling radiator of claim 1, further comprising:

a combustion fuel burner and blower and an exhaust-gas fan.

10. The ceiling radiator of claim 1, further comprising:

an air duct.

11. The ceiling radiator of claim 10, wherein:

the air duct is U-shaped.

12. The ceiling radiator of claim 10, wherein:

the air duct and the radiator form an air channel.

13. The ceiling radiator of claim 10, wherein:

the air duct comprises first and second attachment elements, the air duct being attached to the attachment element of the radiator by the first attachment element.

14. The ceiling radiator of claim 10, wherein:

the air duct is integrally formed with the radiator.

15. The ceiling radiator of claim 1, wherein:

the at least one flow-through heating pipe comprises an insert to produce turbulence, to thereby produce a better heat transfer.

16. A ceiling radiator for heating or cooling rooms of any type, wherein the ceiling radiator hangs freely under a ceiling and directs heat to the ceiling, walls and floors of a room without radiant heat shadows, comprising:

at least one flow-through pipe, the at least one flow-through pipe conducting a heat-conducting fluid, the at least one flow-through pipe including a corrugated surface on the inside of the at least one flow-through pipe, wherein the corrugated surface produces a better heat transfer due to turbulence;

at least three radiant plates projecting from the at least one flow-through pipe, the at least three radiant plates having at least two smooth and profiled surfaces, at least one of the at least three radiant plates including an attachment element for attaching the radiator to a holder suspended from a room ceiling.

* * * * *